(12) United States Patent
Bavishi

(10) Patent No.: US 11,249,924 B2
(45) Date of Patent: Feb. 15, 2022

(54) SECURE DATA COMMUNICATION WITH MEMORY SUB-SYSTEM

(71) Applicant: Micron Technology, Inc., Boise, ID (US)

(72) Inventor: Dhawal Bavishi, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 260 days.

(21) Appl. No.: 16/694,557

(22) Filed: Nov. 25, 2019

(65) Prior Publication Data

US 2021/0157745 A1 May 27, 2021

(51) Int. Cl.
*G06F 12/14* (2006.01)
*G06F 12/02* (2006.01)
*H04L 9/08* (2006.01)
*H04L 9/06* (2006.01)
*H04L 9/32* (2006.01)

(52) U.S. Cl.
CPC ...... *G06F 12/1408* (2013.01); *G06F 12/0246* (2013.01); *H04L 9/0643* (2013.01); *H04L 9/0825* (2013.01); *H04L 9/3242* (2013.01)

(58) Field of Classification Search
CPC ........... G06F 12/1408; G06F 12/0246; H04L 9/0643; H04L 9/0825; H04L 9/3242
See application file for complete search history.

(56) References Cited

U.S. PATENT DOCUMENTS

| | | | |
|---|---|---|---|
| 10,460,110 B1* | 10/2019 | Allo .................. | G06F 3/0622 |
| 10,558,589 B1* | 2/2020 | de Cesare ......... | G06F 21/602 |
| 11,005,655 B2* | 5/2021 | Montero ............ | H04L 9/0861 |
| 2006/0272027 A1* | 11/2006 | Noble ................ | H04L 9/32 726/27 |
| 2009/0046858 A1* | 2/2009 | Iyer .................... | G06F 21/78 380/259 |
| 2015/0143134 A1* | 5/2015 | Hashimoto ........ | G06F 21/6209 713/193 |

* cited by examiner

*Primary Examiner* — Shanto Abedin
(74) *Attorney, Agent, or Firm* — Schwegman Lundberg & Woessner, P.A.

(57) ABSTRACT

Various embodiments described herein provide for secure data communication between a host system and a memory sub-system. For example, some embodiments use a salt value, symmetric encryption, and asymmetric encryption to facilitate secure data communication between the host system and the memory sub-system.

20 Claims, 10 Drawing Sheets

US 11,249,924 B2

SECURE DATA COMMUNICATION WITH MEMORY SUB-SYSTEM

TECHNICAL FIELD

Embodiments of the disclosure relate generally to memory sub-systems, and more specifically, relate to secure data communication with a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
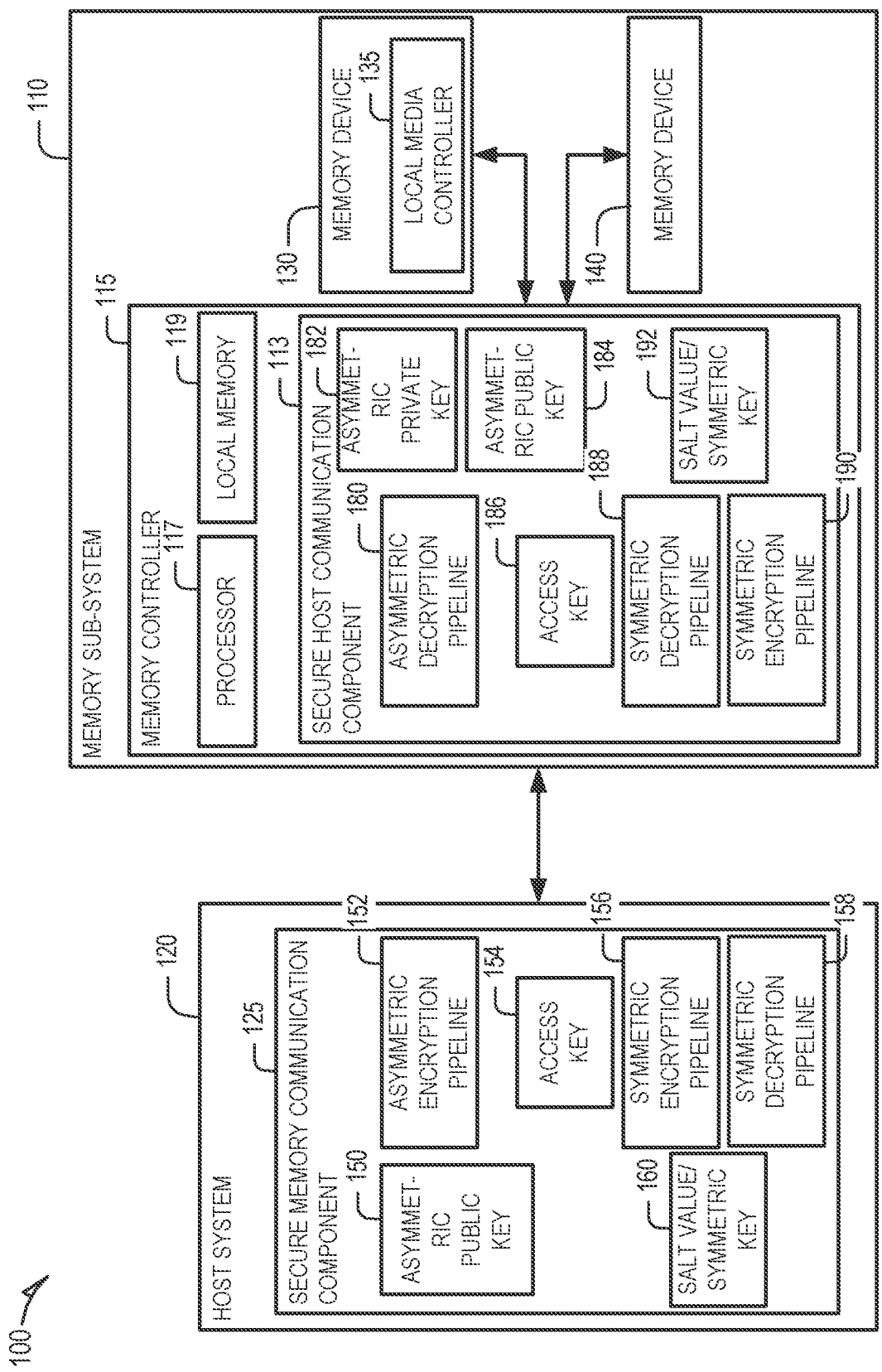
FIG. 1 illustrates an example computing environment that includes a memory sub-system in accordance with some embodiments of the present disclosure.

Aspects of the present disclosure are directed to secure data communication with a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Presently, there are several high-density, non-volatile memory technologies (e.g., new persistent memory media) being developed for use as main memory in computing devices. These memory technologies can enable data to remain in persistent main memory and be subsequently accessed by a software application even after a host system has restarted. As such, these memory technologies are generally well suited for various in-memory computing applications, particularly those that demand terabytes of data be stored in main memory.

Unfortunately, with so much data (e.g., user or sensitive data) being able to be persistently stored in main memory, it can be challenging to keep the stored data secure. Data breathes, where attackers have targeted data on physical memory/primary memory using software and hardware probes, are known to have occurred in the past. Sophisticated prime-and-probe attacks (e.g., using the central processing unit cache, combined with the use of a hardware interposer) can potentially reveal the physical address in persistent main memory of data being accessed, and subsequently the data itself. From an application software view, persistent data is generally stored with address location tables (e.g., data structures to store address pointers to the data), so if an attacker can get access to the physical addresses of these address tables, he or she could potentially gain access to all the address pointers and hence all the data stored at those locations. Additionally, encrypting data stored on the persistent main memory with a powerful standard such as AES (Advanced Encryption Standard) may not be a suitable option, given that powerful encryption standards can be computationally expensive (e.g., can take thousands of processor clock cycles to perform) and slow the performance of the persistent main memory, possibly to a point that could render the persistent main memory unsuitable for use as main memory.

Aspects of the present disclosure address the above and other deficiencies by enabling secure data connection between a host system and a memory sub-system, such as a non-volatile dual in-line memory module (NVDIMM) device (e.g., which may be used as persistent main memory). To facilitate secure data communication between a host system and a memory sub-system, various embodiments described herein use strong encryption based on asymmetric public and private keys, and use weaker encryption based on a symmetric key that changes time-to-time (e.g., changed at irregular time intervals by the host system). Use of various embodiments described herein can prevent (or at least make it challenging for) unauthorized snooping of data on address or data channels (e.g., busses) between a host system and a memory sub-system, thereby mitigating chances of certain hardware-based memory attacks. Additionally, various embodiments described herein can provide secure data communications between a host system and a memory sub-system, while enabling the memory sub-system to maintain main memory data performance.

Disclosed herein are some examples of systems that facilitate secure data communication with a memory sub-system, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM). The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (POO interface, universal serial bus (USB) interface. Fibre Channel, Serial Attached SCSI (SAS), a dual in-line memory module (DIMM) interface (e.g., DIMM socket interface that supports Double Data. Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcolgenide based memories, ferroelectric random access memory (FeRAM), magneto random access memory (MRAM), negative-or (NOR) flash memory, electrically erasable programmable read-only memory (EEPROM), and a cross-point array of non-volatile memory cells.

One type of memory cell, for example, single level cells (SLC) can store one hit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a secure host communication component 113 that can enable the memory sub-system 110 to securely communicate data with the host system 120 in accordance with various embodiments. In some embodiments, the memory sub-system controller 115 includes at least a portion of the secure host communication component 113. For example, the memory sub-system controller 115 can include a processor 117 (processing device) configured to execute instructions stored in local memory 119 for performing the operations described herein. In some embodiments, the secure host communication component 113 is part of the host system 120, an application, or an operating system.

Additionally, the host system 120 includes a secure memory communication component 125 that enables the host system 120 to securely communicate data with the memory sub-system 110 in accordance with various embodiments. As shown, the secure memory communication component 125 (of the host system 120) includes an asymmetric encryption pipeline 152, a symmetric encryption pipeline 156, and a symmetric decryption pipeline 158, and the secure host communication component 113 (of the memory sub-system controller 115) includes an asymmetric decryption pipeline 180, a symmetric decryption pipeline 188, and a symmetric encryption pipeline 190.

According to some embodiments, a manufacturer of the memory sub-system generates an asymmetric private and public key pair (e.g., each 1024 bits) and stores the asymmetric private and public key pair on the memory sub-system. In FIG. 1, the asymmetric private and public key pair is represented by asymmetric private key 182 and asymmetric public key 184. The manufacturer of the memory sub-system can also generate and store an access key (e.g., device-specific access key) on the memory sub-system 110, and generate and store an initial salt value (that also serves as an initial symmetric key) on the memory sub-system 110. Each of the access key and the salt value/symmetric key can be, for example, 64 bit in size. In FIG. 1, the access key is represented by access key 186, and the stored salt value/symmetric key is represented by salt value/symmetric key 192, For some embodiments, a copy of the initial salt value/symmetric key 192 and the access key 186 are provided (e.g., by the manufacturer of the memory sub-system) to the host system 120 (e.g., by way of a user who causes both to be stored on the host system 120). In FIG. 1, access key 154 and salt value/symmetric key 160 respectively represent the copies of the initial salt value/symmetric key 192 and the access key 186 once stored on the host system 120.

During operation, the secure memory communication component 125 can cause the host system 120 to request a copy of the asymmetric public key 184 from the memory sub-system 110. For some embodiments, the portion of the secure memory communication component 125 causing this request can be implemented as part of startup code or a basic input/output operating system (BIOS) driver of the host system 120, thereby causing the host system 120 to make the request at system startup. Once provided by the memory sub-system 110 to the host system 120, the host system 120 can store the copy of the asymmetric public key 184 on the host system 120, which is represented in FIG. 1 by asymmetric public key 150. For some embodiments, the memory sub-system includes one or more mode registers, in accordance with a memory protocol (e.g., a Non-Volatile Dual In-Line Memory Module-P (NVDIMM-P) memory protocol), which the host system 120 can use to gain access to a copy of the asymmetric public key 184. The one or more mode registers can be at a specific memory address of the memory sub-system 110. The request for the copy of the asymmetric public key 184 can include a request to read out the asymmetric public key 184 from the specific memory address.

After the host system 120 receives a copy of the asymmetric public key 184 from the memory sub-system 110 and stores the copy on the host system 120 for use as the asymmetric public key 150, the secure memory communication component 125 can use the asymmetric public key 150 to encrypt (via the asymmetric encryption pipeline 152) the access key 154 while using the salt value/symmetric key 160 as salt in the encryption process (e.g., applying the salt value/symmetric key 160 to the access key 154 and then encrypting the resulting data using the asymmetric public key 150). Thereafter, the secure memory communication component 125 can cause the host system 120 to send the resulting encrypted data to the memory sub-system 110. For instance, the secure memory communication component 125 can cause the host system 120 to write the encrypted data to one or more mode registers (e.g., NVDIMM-P mode register) of the memory sub-system 110, from where the memory sub-system 110 can then subsequently access the encrypted data.

Eventually, the secure host communication component 113 can cause the memory sub-system 110 to access the encrypted data received from the host system 120 and use the asymmetric private key 182 and the salt value/symmetric key 192 as salt to decrypt the encrypted data via the asymmetric decryption pipeline 180 (e.g., decrypt the encrypted data and remove application of the salt value/symmetric key 192 from the resulting data) to obtain a copy of the access key 154 from the encrypted data. Once the memory sub-system 110 obtains a copy of the access key 154 from the encrypted data provided by the host system 120, the secure host communication component 113 can determine if the access key 154 matches the access key 186 stored locally on the memory sub-system 110. If the access keys do not match, the secure host communication component 113 can cause the memory sub-system 110 to deny the host system 120 access to the memory devices 130, 140. However, if the access keys match, the secure host communication component 113 can cause the memory sub-system 110 to grant (e.g., authorize) the host system 120 access (e.g., read or write access) with respect to the memory devices 130, 140.

Once access is granted, the secure memory communication component 125 can enable the host system 120 to securely communicate data (e.g., command-related write data, destination memory address, or both) to the memory sub-system 110 by using the salt value/symmetric key 160 as a symmetric key to encrypt the data (via the symmetric encryption pipeline 156) prior to the data being sent to the memory sub-system 110. The secure host communication component 113 can enable the memory sub-system 110 to receive the encrypted data and decrypt it (via the symmetric decryption pipeline 188) using the salt value/symmetric key 192 as a symmetric key. Conversely, the secure host communication component 113 can enable the memory sub-system 110 to securely communicate data (e.g., command-related response data, such as read data) to the host system 120 by using the salt value/symmetric key 192 as a symmetric key to encrypt the data (via the symmetric encryption pipeline 190) prior to the data being sent to the host system 120. The secure memory communication component 125 can enable the host system 120 to receive the encrypted data and decrypt it (via the symmetric decryption pipeline 158) using the salt value/symmetric key 160 as a symmetric key.

To provide additional security to the data communication, some embodiments change (e.g., replace, update) the salt value/symmetric keys 160, 192 stored on the host system 120 and the memory sub-system 110 to a new salt value/symmetric key from time-to-time. This change/replacement/update can be performed at regular time intervals or at irregular time intervals for added security. In this way, some embodiments can change the new salt value/symmetric keys 160, 192 before an attacker has enough time to break the symmetric encryption using brute-force or other techniques. Depending on the embodiment, the secure memory communication component 125 can cause the host system 120 to initiate the replacement of the current salt value/symmetric keys 160, 192 with a new salt value/symmetric key or, alternatively, the secure memory communication component 113 can enable the memory sub-system 110 to initiate the replacement of the current salt value/symmetric keys 160, 192 with a new salt value/symmetric key. As used herein, the current host salt value can refer to the current salt value/symmetric keys 160 currently stored on the host system 120, while the current memory sub-system salt value can refer to the current salt value/symmetric keys 192 currently stored on the memory sub-system 110.

For some embodiments, the secure memory communication component 125 causes the host system 120 to change (e.g., replace, update) the salt value/symmetric keys 160 on the host system 120, and the salt value/symmetric key 192 on the memory sub-system 110, with a new salt value at a regular or irregular time interval. For instance, at a given point in time, the secure memory communication component 125 can cause the host system 120 to: generate a new salt value/symmetric key; send to the memory sub-system 110 a request that includes encrypted data (encrypted using the salt value/symmetric key 160 currently stored on the host system 120 as a symmetric key) including the new salt value/symmetric key; and storing the new salt value/symmetric key as the salt value/symmetric key 160 after the memory sub-system 110 indicates that the change (e.g., replacement, update) of the salt value/symmetric key 192 with the new salt value/symmetric key is complete. Upon receiving the request from the host system 120, the memory sub-system 110 can obtain the new salt value/symmetric key from the encrypted data by decrypting the encrypted data using the salt value/symmetric key 192 currently stored on the memory sub-system 110. The memory sub-system 110 can then change (e.g., replace, update) the salt value/symmetric key 192 currently stored on the memory sub-system 110 with the obtained new salt value/symmetric key, and then inform the host system 120 that the change (e.g., replacement, update) of the salt value/symmetric key 192 is complete. For some embodiments, the request (for changing the salt value/symmetric key) from the host system 120 to the memory sub-system 110 includes a command or request to write the new salt value/symmetric key (contained in the encrypted data) to a particular memory address of the memory sub-system 110, such as a reserved memory space (e.g., NVDIMM-P mode register) associated with the particular memory address.

As described herein, by the secure memory communication component 125, the host system 120 can initially send to the memory sub-system 110 asymmetrically encrypted data that includes the access key 154 with an initially known salt value/symmetric key (e.g., initial version of the salt value/symmetric key provided by the memory sub-system manufacturer), which is stored on the host system as the salt value/symmetric key 160 and stored on the memory sub-system (e.g., at the time of its manufacture) as the salt value/symmetric key 192. Thereafter, the salt value/symmetric key used by both the host system 120 and on the memory sub-system 110 can include the last salt value/symmetric key generated and stored (via a replacement operation described herein) on the host system 120 (as the salt value/symmetric key 160) and on the memory sub-system 110 (as the salt value/symmetric key 192) prior to power down of the host system 120 or the memory sub-system 110. For some embodiments, the salt value/symmetric key 192 is stored on persistent memory media of the memory sub-system 110 (e.g., which may form a part of one of the memory devices 130, 140), thereby providing the salt value/symmetric key 192 with power-safe and media-safe storage. Likewise, the salt value/symmetric key 160 can be stored on persistent memory media of the host system 120 (e.g., flash memory of BIOS). At every start-up of the host system 120 or the memory sub-system 110, the host system 120 can send to the memory sub-system 110 asymmetrically encrypted data that includes the access key with the last salt value/symmetric key (the salt value/symmetric key 160 currently stored on the host system 120) as salt. By using this continuously-changing salt value/symmetric key in this way at startup, various embodiments can address the potential vulnerability posed by the same bits being sent to the memory sub-system 110 each time the asymmetrically encrypted data is sent (at startup) from the host system 120 to the memory sub-system 110. Without use of the salt with the access key 154, the deterministic nature of asymmetric cryptography would result in the asymmetrically encrypted data including the same bits. Using the last salt value/symmetric key 160 as salt can result in the asymmetric encrypted data including different bits over time, thereby deterring an attacker from gaining access to the access key 154.

For some embodiments, the secure data communication described herein is implemented with respect to a non-deterministic memory protocol, such as NVDIMM-P memory protocol. With respect to a NVDIMM-P memory protocol, the host system 120 can represent an NVDIMM-P initiator and the memory sub-system 110 can represent an NVDIMM-P target. The asymmetric private and public key pair can be stored on the NVDIMM-P target (e.g., generated and burnt into the memory sub-system 110 during manufacturing). The NVDIMM-P target can send the asymmetric public key sent to the NVDIMM-P initiator (e.g., at the request of the NVDIMM-P) on the startup of the NVDIMM-P initiator or the NVDIMM-P target. The NVDIMM-P initiator can send the NVDIMM-P target a command/request to read the asymmetric public key (e.g., from a NVDIMM-P mode register), and the NVDIMM-P target can send the asymmetric public key to the NVDIMM-P initiator in response. The NVDIMM-P initiator can receive and store the asymmetric public key. The NVDIMM-P initiator can be provided (e.g., by the memory sub-system manufacturer) with the access key associated with the NVDIMM-P target and an initial known salt value/symmetric key, which the NVDIMM-P initiator can store. The same access key and initial known salt value/symmetric key can be stored on the NVDIMM-P target during its manufacture. Using the asymmetric public key, the NVDIMM-P initiator can generate asymmetrically encrypted data that includes the access key with the initial salt value/symmetric key as salt. The asymmetrically encrypted data can be sent to and received by the NVDIMM-P target, which can obtain the access key from the asymmetrically encrypted data by decrypting the asymmetrically encrypted data using the asymmetric private key and removing the salt value/symmetric key from the decrypted data. The NVDIMM-P target can grant (e.g., authorize) the NVDIMM-P initiator access to one or more memory devices (130, 140) of the NVDIMM-P target in response to the access key provided by the NVDIMM-P initiator matching the access stored on the NVDIMM-P target. After the NVDIMM-P target grants the NVDIMM-P initiator access to the one or more memory devices, the NVDIMM-P target and the NVDIMM-P initiator can communicate between each other data (e.g., including command-related data or memory addresses) that is symmetrically encrypted using the salt value/symmetric key as a symmetric key. Depending on the embodiment, the NVDIMM-P target and the NVDIMM-P initiator can operate in address-only encryption mode (where only memory address data is symmetrically encrypted before being communicated), address-only encryption mode (where only command-related data is symmetrically encrypted before being communicated), or in an address-and-data mode (where both memory address data and command-related data is encrypted before being communicated). Additionally, for some embodiments, the NVDIMM-P target and the NVDIMM-P initiator can operate in a mode that symmetrically encrypts commands sent from the NVDIMM-P initiator to the NVDIMM-P target.

For some embodiments, the symmetric decryption performed by each of the host system 120 (via the symmetric decryption pipeline 158) and the memory sub-system 110 (via the symmetric decryption pipeline 188) can be performed after or in parallel with an error correction code (FCC) check performed on the data (e.g., memory address data or command-related data) being communicated between the host system 120 and the memory sub-system. If an error in FCC is determined, symmetric decryption being performed via the symmetric decryption pipeline 158 or the symmetric decryption pipeline 188 can be stopped and, additionally, an error can be issued (e.g., in accordance with the non-deterministic memory protocol). In this way, a clock cycles of the host system 120 or the memory sub-system 110 are not wasted on symmetric decryption after an ECC error is discovered.

Further details with regards to the operations of the secure host communication component 113 and the secure memory communication component 125 are described below.

Figure 2:
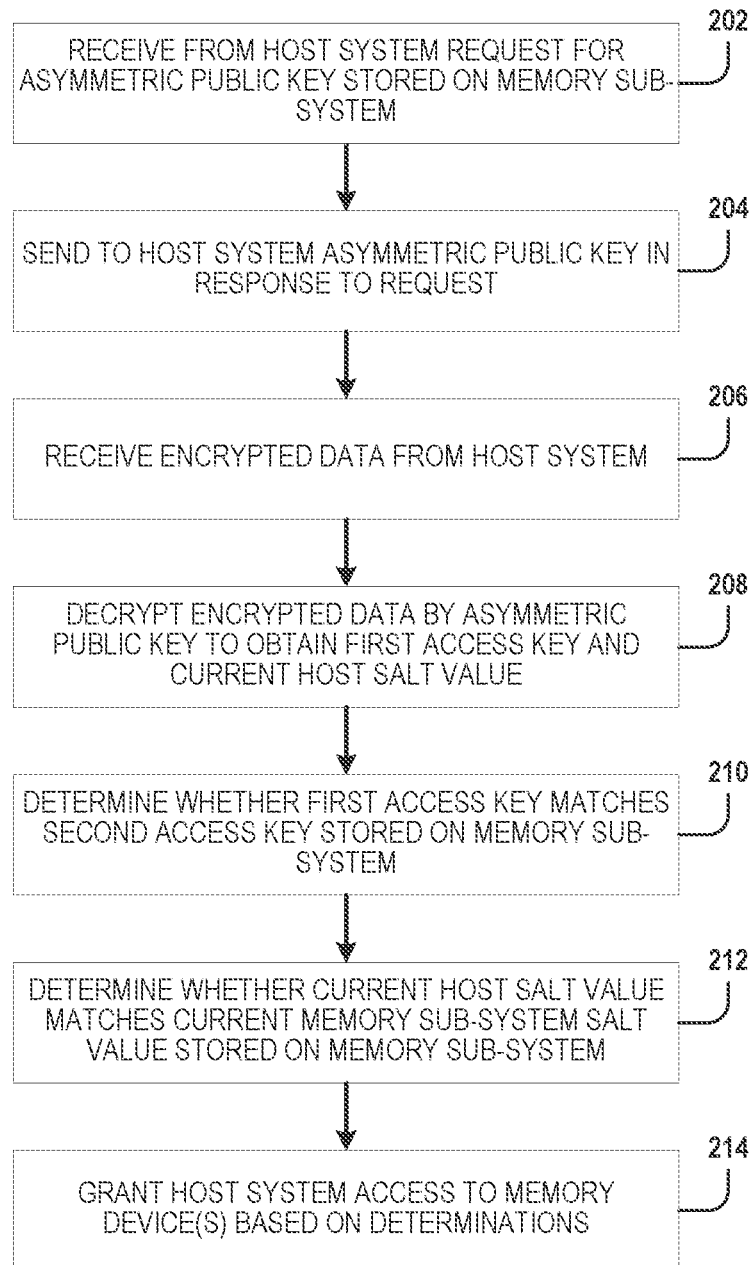
FIGS. 2 and 3 are flow diagrams of example methods for a memory sub-system to facilitate secure data communication with a host system, in accordance with some embodiments of the present disclosure.
Figure 3:
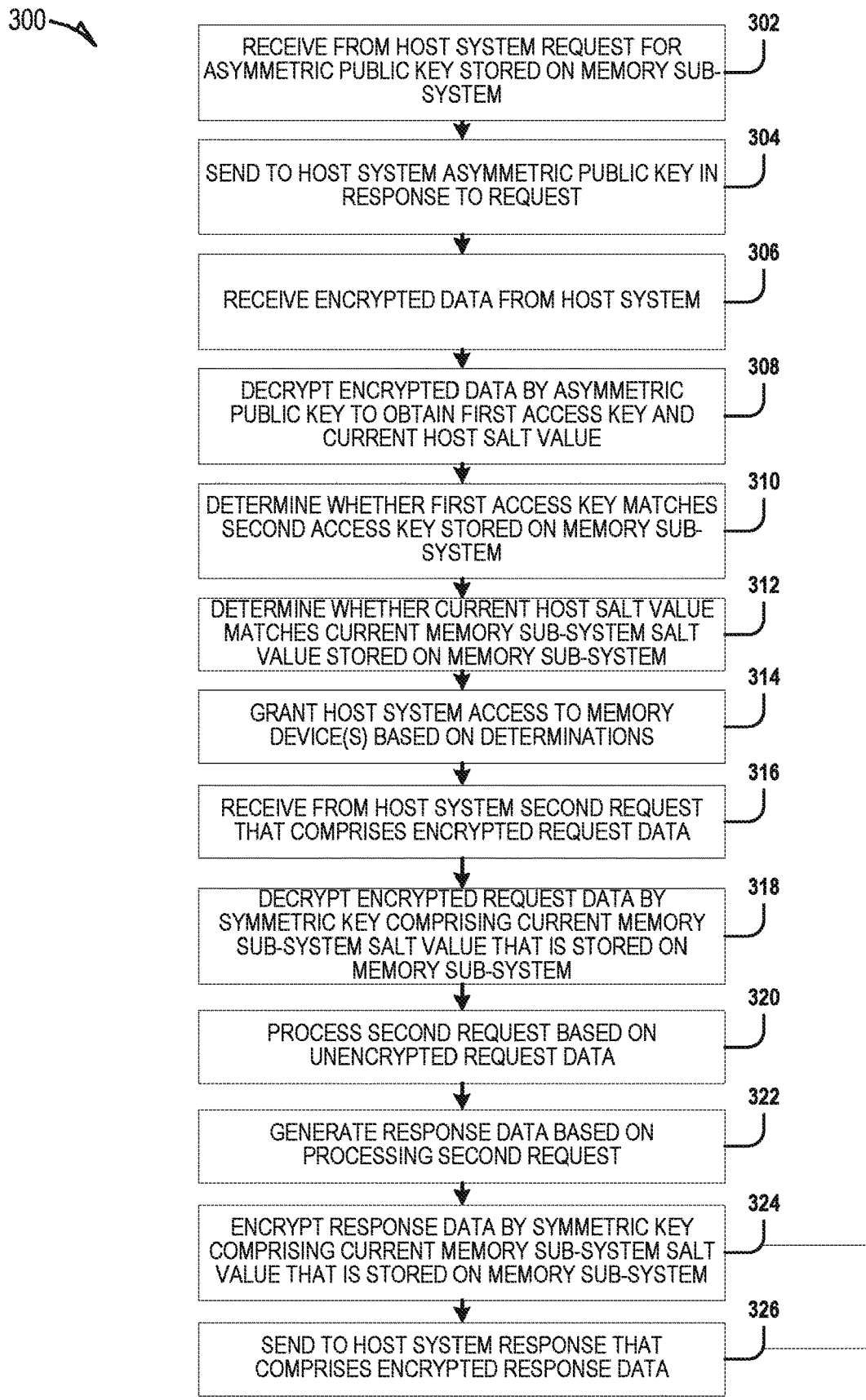

FIGS. 2 and 3 are flow diagrams of example methods 200, 300 for a memory sub-system to facilitate secure data communication with a host system, in accordance with some embodiments of the present disclosure. The methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory sub-system controller 115 of FIG. 1 based on the secure host communication component 113. Additionally, in some embodiments, the method 300 is performed by the memory sub-system controller 115 of FIG. 1 based on the secure host communication component 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 200 of FIG. 2, at operation 202, a processing device (e.g., of the memory sub-system controller 115) receives, from a host system (e.g., 120), a request for an asymmetric public key stored on a memory sub-system. For some embodiments, the request for the asymmetric public key specifies a particular memory address associated with a reserved memory space of the memory sub-system that is used to store the asymmetric public key. Additionally, the particular memory address can be associated with memory space that is accessible by the host system prior to the host system providing an access key to the memory sub-system or the host system being granted access by the memory sub-system to one or more memory devices of the memory sub-system. For some embodiments, the particular memory address is associated with a mode register of the memory sub-system, where the mode register is in accordance with a Non-Volatile Dual In-Line Memory Module-P (NVDIMM-P) memory protocol. Accordingly, the request can comprise a command (e.g., NVDIMM-P command) to read from the particular memory address.

At operation 204, the processing device sends, to the host system, the asymmetric public key in response to the request of operation 202. As described herein, the asymmetric public key can be provided from a reserved memory space of the memory sub-system, such as a NVDIMM-P mode register. Accordingly, the asymmetric public key is sent to the host system as a response to the request (sent at operation 202) comprising a read command (e.g., NVDIMM-P read command). For some embodiments, the asymmetric public key is one associated (e.g., paired) with an asymmetric private key that is also stored on the memory sub-system. According to various embodiments, the asymmetric private key is maintained as a secret and not provided by the memory sub-system to the host system. The asymmetric public and private keys can be initially stored on the memory sub-system as part of a process for manufacturing the memory sub-system. The process can be performed, for example, by the memory sub-system manufacturer at a manufacturing facility prior to the memory sub-system being distributed for use. The process can further comprise generating the pair of asymmetric public and private keys using a processing device external to the memory sub-system (e.g., host system of the manufacturer), or using a processing device of the memory sub-system. The asymmetric public and private keys can be stored on the memory sub-system as read-only data (e.g., permanently stored on the memory sub-system).

At operation 206, the processing device receives, from the host system, encrypted data that comprises a first access key. For some embodiments, the memory sub-system receives the encrypted data from the host system via a reserved memory space of the memory sub-system (e.g., a mode register in accordance with a. NVDIMM-P memory protocol) that is associated with a particular memory address to which the host system can write the encrypted data. The first access key can be provided (e.g., electronically) to the host system by a manufacturer of the memory sub-system (e.g., prior to operation 206). Once provided by the manufacturer, the first access key can be stored on the host system (e.g., by a user of the host system) for subsequent use by the host system in connection with secure data communication operations described herein.

At operation 208, the processing device decrypts, by an asymmetric private key and a current host salt value, the encrypted data to obtain the first access key from the encrypted data. According to various embodiments, the asymmetric private key used for operation 208 is stored on the memory sub-system. For some embodiments, decrypting the encrypted data by an asymmetric private key comprises decrypting the encrypted data by asymmetric private key and removing of the current host salt value from the resulting data to obtain the first access key (e.g., extracting the current host salt value from the resulting data).

At operation 210, the processing device determines whether the first access key (obtained from decrypting the encrypted data at operation 208) matches a second access key stored on the memory sub-system. The first access key can represent a host-provided access key, and the second access key can represent a memory-side access key that the host-provided access key would need to match in order for the host system to gain access (e.g., read or write access) to one or more memory devices of the memory sub-system. The second access key can be stored on a reserved memory space of the memory sub-system. According to various embodiments, the second access key is maintained as a secret and not provided by the memory sub-system to the host system. For some embodiments, the second access key is initially stored on the memory sub-system as part of a process for manufacturing the memory sub-system. The process can be performed, for example, by the memory sub-system manufacturer at a manufacturing facility prior to the memory sub-system being distributed for use. The process can further comprise generating the second access key using a processing device external to the memory sub-system (e.g., host system of the manufacturer), or using a processing device of the memory sub-system. The second access key can be stored on the memory sub-system as read-only data (e.g., permanently stored on the memory sub-system).

At operation 212, the processing device determines whether the current host salt value (obtained from decrypting the encrypted data at operation 208) matches a current memory sub-system salt value stored on the memory sub-system. For some embodiments, the current memory sub-system salt value is initially stored on the memory sub-system as part of a process for manufacturing the memory sub-system. The process can be performed, for example, by the memory sub-system manufacturer at a manufacturing facility prior to the memory sub-system being distributed for use. The process can further comprise generating the current memory sub-system salt value using a processing device external to the memory sub-system (e.g., host system of the manufacturer), or using a processing device of the memory sub-system. The current memory sub-system salt value can be stored on the memory sub-system in reserved memory space of the memory sub-system, such as a NVDIMM-P mode register. For some embodiments, after the initial storage of the current memory sub-system salt value on the memory sub-system, the current memory sub-system salt value can change (e.g., be replaced over time) by request from the host system, as described herein.

At operation 214, the processing device grants (e.g., authorizes) the host system access to one or more memory devices of the memory sub-system based on the determinations of operation 210 and operation 212. For instance, with respect to various embodiments, the processing device grants the host system access to the one or more memory devices in response to the processing device determining that the first access key (received from the host system) matches the second access key (stored on the memory sub-system) and determining that the current host salt value (received from the host system) matches the current memory sub-system salt value (stored on the memory sub-system).

Referring now to the method 300 of FIG. 3, a processing device (e.g., of the memory sub-system controller 115) performs operations 302 through 314, which can be respectively similar to operations 202 through 212 of the method 200 described above with respect to FIG. 2.

At operation 316, the processing device receives, from the host system (e.g., 120), a second request comprising encrypted request data. Depending on the embodiment, the second request can comprise a command and can further comprise a memory address (e.g., destination or source memory address) or a data, where at least one of the memory address or the data is encrypted (e.g., encrypted by the host system using a symmetric key described herein). For some embodiments, the command (e.g., command encoding) of the second request is in encrypted form when it is sent from the host system to the memory sub-system. Additionally, for some embodiments, the second request is received from the host system according to a memory protocol, such as a non-deterministic memory protocol (e.g., NVDIMM-P memory protocol). For instance, the second request can comprise a command (e.g., NVDIMM-P PWRITE command) to the memory sub-system, a memory address (e.g., destination memory address) of the memory sub-system to be used with the command, and data to be used with the command (e.g., to be written to the destination address). The command (e.g., encrypted command encoding) and the memory address (e.g., encrypted destination or source memory address) can be sent from the host system to the memory sub-system over a command (CMD) line in accordance with a NVDIMM-P memory protocol, and the data (e.g., encrypted data) can be sent from the host system to the memory sub-system over a data line (e.g., DQ line) in accordance with the NVDIMM-P memory protocol.

At operation 318, the processing device decrypts, by a symmetric key, the encrypted request data (of the second request received at operation 316) to obtain unencrypted request data from the encrypted request data, where the symmetric key comprises the current memory sub-system salt value currently stored on the memory sub-system. As described herein, the current memory sub-system salt value currently stored by the memory sub-system can be used by the memory sub-system both: (a) as a salt value with respect to asymmetric encryption operations performed by the memory sub-system (e.g., operation 208 and operation 308 described with respect to the method 300) in connection with secure data communication with the host system; and (b) as a symmetric key for symmetric operations performed by the memory sub-system (e.g., operation 318 described later with respect to the method 300) in connection with secure data communication with the host system. Depending on the embodiment, the unencrypted request data can comprise at least one of memory command, command-related data, and a memory address.

At operation 320, the processing device processes the second request based on the unencrypted request data (obtained at operation 318). The second request can comprise, for example, a read memory command and a source memory address, or a write memory command, a destination memory address, and data to be written to the destination memory address. The encrypted request data can comprise at least one memory address, command-related data, or a memory command (e.g., NVDIMM-P command encoding).

At operation 322, the processing device generates response data based on the processing of the second request at operation 320. For instance, where the second request comprises a read memory command and a source memory address, the response data can comprise data read from the source memory address. For instance, the response data can comprise data read from a source memory address in response to the second request comprising a read command.

At operation 324, the processing device encrypts, by the symmetric key, the response data (generated at operation 322) to generate encrypted response data. As described herein, the symmetric key comprises the current memory sub-system salt value stored on the memory sub-system.

At operation 326, the processing device sends, to the host system, a response comprising the encrypted response data (obtained at operation 324). For some embodiments the response is sent to the host system in accordance with a memory protocol, such as a non-deterministic memory protocol (e.g., a NVDIMM-P memory protocol).

For some embodiments, operations 316 through 320 facilitate replacement of the current memory sub-system salt value stored on the memory sub-system with a new salt value provided by the host system. For instance, as described herein, the memory sub-system uses a particular memory address of the memory sub-system to store the current memory sub-system salt value on the memory sub-system. For some embodiments, this particular memory address is associated with reserved memory space on the memory sub-system, such as a mode register of the memory sub-system in accordance with a NVDIMM-P memory protocol. At operation 316, the processing device of the memory sub-system can receive, from the host system, the second request comprising encrypted request data that specifies a new salt value (e.g., generated by the host system) and that further specifies the particular memory address. The second request can further comprise a write command (e.g., NVDIMM-P PWRITE command) that instructs the memory sub-system to write the new salt value to the particular memory address, thereby setting the current memory sub-system salt value to the new salt value. At operation 318, the processing device of the memory sub-system can decrypt the encrypted request data by the symmetric key (the current memory sub-system salt value stored by the memory sub-system) to obtain the new salt value and the particular memory address from the encrypted request data. As described herein, the encrypted new salt value and the encrypted particular memory address can be received by the memory sub-system from the host system on separate DQ and CMD lines respectively. At operation 320, the processing device of the memory sub-system can process the second request (e.g., write command) based on the unencrypted request data (e.g., the new salt value and the particular memory address) to cause the new salt value to be written to the particular memory address, thereby causing the replacement of the current memory sub-system salt value stored on the memory sub-system with the new salt value. Subsequently, the memory sub-system can send a response (e.g., on RSP_n line) to the host system indicating whether the second request was successfully processed by the memory sub-system.

Figure 4:
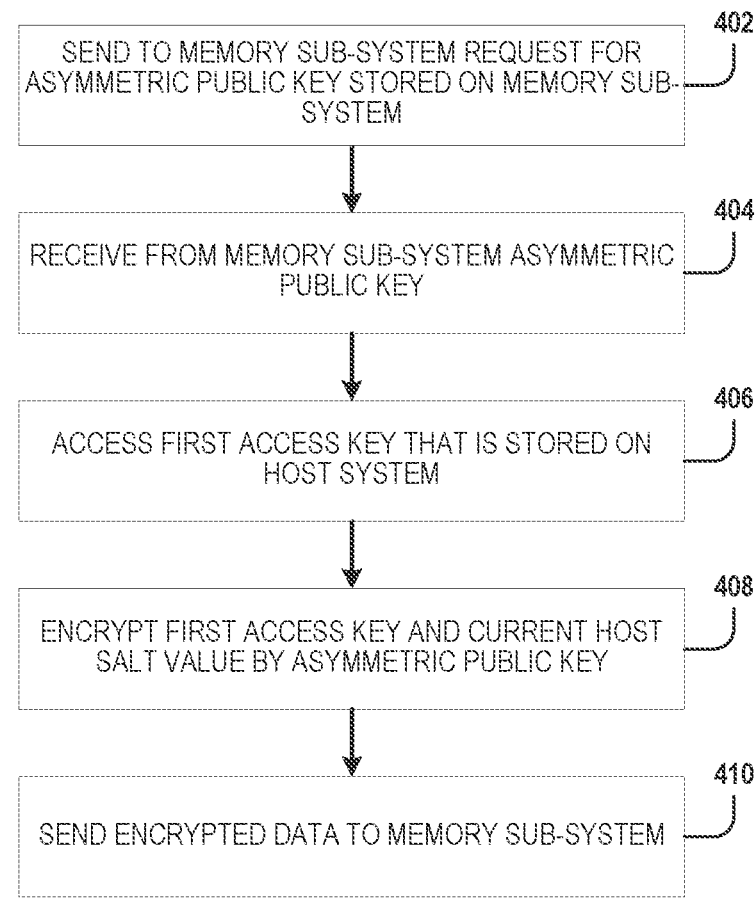
FIGS. 4 and 5 are flow diagrams of example methods for a host system to facilitate secure data communication with a memory sub-system, in accordance with some embodiments of the present disclosure.
Figure 5:
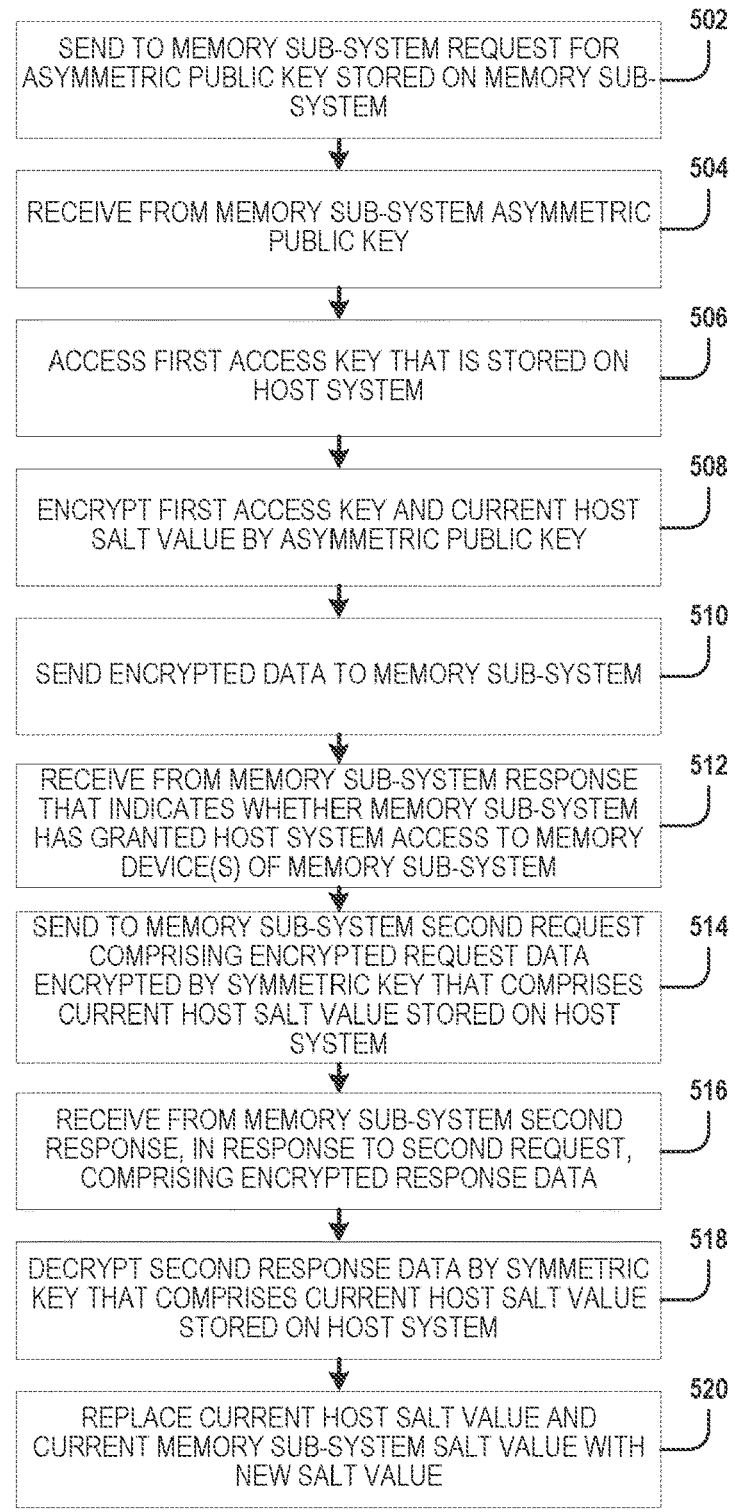

FIGS. 4 and 5 are flow diagrams of example methods 400, 500 for a host system to facilitate secure data communication with a memory sub-system, in accordance with some embodiments of the present disclosure. The methods 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by a processor of the host system 120 of FIG. 1 based on the secure memory communication component 125. Additionally, in some embodiments, the method 500 is performed by a processor of the host system 120 of FIG. 1 based on the secure memory communication component 125. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 400 of FIG. 4, at operation 402, a processing device of the host system 120) sends, from a host system to a memory sub-system, a request for an asymmetric public key stored on the memory sub-system (e.g., 110). For some embodiments, the host system sends this request to the memory sub-system when the host system initially attempts to gain access (e.g., read or write access) to one or more memory devices of the memory sub-system (e.g., after initial power-up of the host system or the memory sub-system). For some embodiments, the request is sent to the memory sub-system in accordance with a memory protocol, such as a non-deterministic memory protocol (e.g., NVDIMM-P memory protocol). The request can comprise a command (e.g., NVDIMM-P command) to read from the particular memory address.

At operation 404, the processing device receives, at the host system, the asymmetric public key from the memory sub-system. For various embodiments, the asymmetric public key is sent by the memory sub-system to the host system in response to the request sent by the host system at operation 402. For some embodiments, the asymmetric public key is received from the memory sub-system in accordance with a memory protocol, such as a non-deterministic memory protocol (e.g., a NVDIMM-P memory protocol). For instance, the asymmetric public key may be received as a response to a read command sent by the host system to the memory sub-system.

At operation 406, the processing device accesses, by the host system, a first access key currently stored on the host system. As described herein, the first access key can be provided (e.g., electronically) by a manufacturer of the memory sub-system (e.g., prior to operation 406). Once provided by the manufacturer, the first access key can be stored on the host system (e.g., by a user of the host system) for subsequent use by the host system.

At operation 408, the processing device encrypts, by the host system, the first access key (accessed at operation 406) and a current host salt value by the asymmetric public key to generate encrypted data, where the current salt value used is currently stored on the host system. For some embodiments, encrypting the first access key and the current host salt value by the asymmetric public key comprises applying (e.g., adding, concatenating, or otherwise combining) the current host salt value to the first access key and encrypting the resulting data using the asymmetric public key.

At operation 410, the processing device sends, from the host system to the memory sub-system, the encrypted data (obtained at operation 408). For some embodiments, sending the encrypted data to the memory sub-system comprises writing the encrypted data (comprising the first access key) to a particular memory address of the memory sub-system, such as a particular memory address associated with a reserved memory space of the memory sub-system (e.g., a mode register in accordance with a NVDIMM-P memory protocol). For some embodiments, the encrypted data is sent to the memory sub-system in accordance with a memory protocol, such as a non-deterministic memory protocol (e.g., NVDIMM-P memory protocol).

Referring now to the method 500 of FIG. 5, a processing device (e.g., of the host system 120) performs operations 502 through 510, which can be respectively similar to operations 402 through 410 of the method 400 described above with respect to FIG. 4.

At operation 512, the processing device receives, at the host system, a response from the memory sub-system indicating whether the memory sub-system has granted (e.g., authorized) the host system access to one or more memory devices of the memory sub-system (in response to the encrypted data sent at operation 510). For some embodiments, the response is received from the memory sub-system in accordance with a memory protocol, such as a non-deterministic memory protocol (e.g., a NVDIMM-P memory protocol).

At operation 514, the processing device sends, from the host system to the memory sub-system, a second request comprising encrypted request data. For some embodiments, this sending comprises encrypting, by a symmetric key, at least one of memory command data or memory address data to generate the encrypted requested data, where the symmetric key comprises the current host salt value currently stored on the host system. As described herein, the current host salt value currently stored by the host system can be used by the host system both: (a) as a salt value with respect to asymmetric encryption operations performed by the host system (e.g., operation 508) in connection with secure data communication with the memory sub-system; and (h) as a symmetric key for symmetric operations performed by the host system (e.g., operation 514) in connection with secure data communication with the memory sub-system. The second request can comprise, for example, a read memory command and a source memory address, or a write memory command, a destination memory address, and data to be written to the destination memory address. The encrypted request data can comprise at least one memory address, command-related data, or a memory command (e.g., NVDIMM-P command encoding). For some embodiments, the second request comprises a write command to a particular memory address of the memory sub-system used for storing the current memory sub-system salt value, thereby facilitating the replacement of the current memory sub-system salt value stored on and used by the memory sub-system. For some embodiments, the second request is sent to the memory sub-system 110 in accordance with a memory protocol, such as a non-deterministic memory protocol (e.g., a NVDIMM-P memory protocol).

At operation 516, the processing device receives, from the memory sub-system, a second response comprising encrypted response data. For some embodiments, the second response is received in response to the second request sent from the host system to the memory sub-system at operation 514. For some embodiments, the second response is received from the memory sub-system in accordance with a memory protocol, such as a non-deterministic memory protocol (e.g., a NVDIMM-P memory protocol).

At operation 518, the processing device decrypts, by the symmetric key, the encrypted response data (of the second response received at operation 516) to obtain unencrypted response data from the encrypted request data, where the symmetric key comprises the current host salt value currently stored on the host system. For instance, the unencrypted response data can comprise data read from a source memory address in response to the second request comprising a read command.

At operation 520, the processing device replaces the current host salt value (currently stored on the host system) and the current memory sub-system salt value (currently stored on the memory sub-system) with a new salt value. According to some embodiments, replacing the current salt values with a new salt value comprises generating a new salt value and, thereafter, encrypting the new salt value by the symmetric key to generate the encrypted requested data. As described herein, the symmetric key can comprise the current host salt value currently stored on the host system. The processing device of the host system can send a new request to the memory sub-system, where the new request comprises the encrypted request data. Depending on the embodiment, the new request can comprise a request to write (e.g., write command) the encrypted request data to a particular memory address (e.g., one associated with a mode register in accordance with a NVDIMM-P memory protocol), or can comprise a request to set (or replace) the current memory sub-system salt value (currently stored on the memory sub-system) with the new salt value provided in the encrypted request data. Subsequently, the processing device of the host system can receive, from the memory sub-system, a new response indicating whether the new request (e.g., to write/set/replace new salt value) was successfully completed. Based on the response, the processing device of the host system can store the new salt value on the host system as the current host salt value, thereby replacing the current host salt value with the new salt value (the same one used to replace the current memory sub-system salt value stored on the memory sub-system). Additionally, after receiving the new request from the host system, the memory sub-system can use (e.g., store) the new salt value as a replacement for the current memory sub-system salt value stored on the memory sub-system prior to the new request. Accordingly, operation 520 can facilitate the current salt value being replaced with the new salt value on both the host system and the memory sub-system, such that each of the host system and the memory sub-system can use the new salt value: (a) as a salt value with respect to subsequent asymmetric encryption operations performed in connection with secure data communication between the host system and the memory sub-system; and (b) as a symmetric key for subsequent symmetric operations performed in connection with secure data communication between the host system and the memory sub-system. Depending on the embodiment, operation 520 can be performed by the processing device of the host system in response to one or more criteria, at regular time intervals, or at irregular time intervals (e.g., random time intervals to increase security).

FIGS. 6A through 6D provide an interaction diagram illustrating interactions between components of the computing environment 100 in the context of some embodiments in which a method for secure data communication with a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIG. 6, the host system can include the host system 120, the memory sub-system controller can include the memory sub-system controller 115, and the memory device can include the memory device 130 or 140.

Figure 6A:
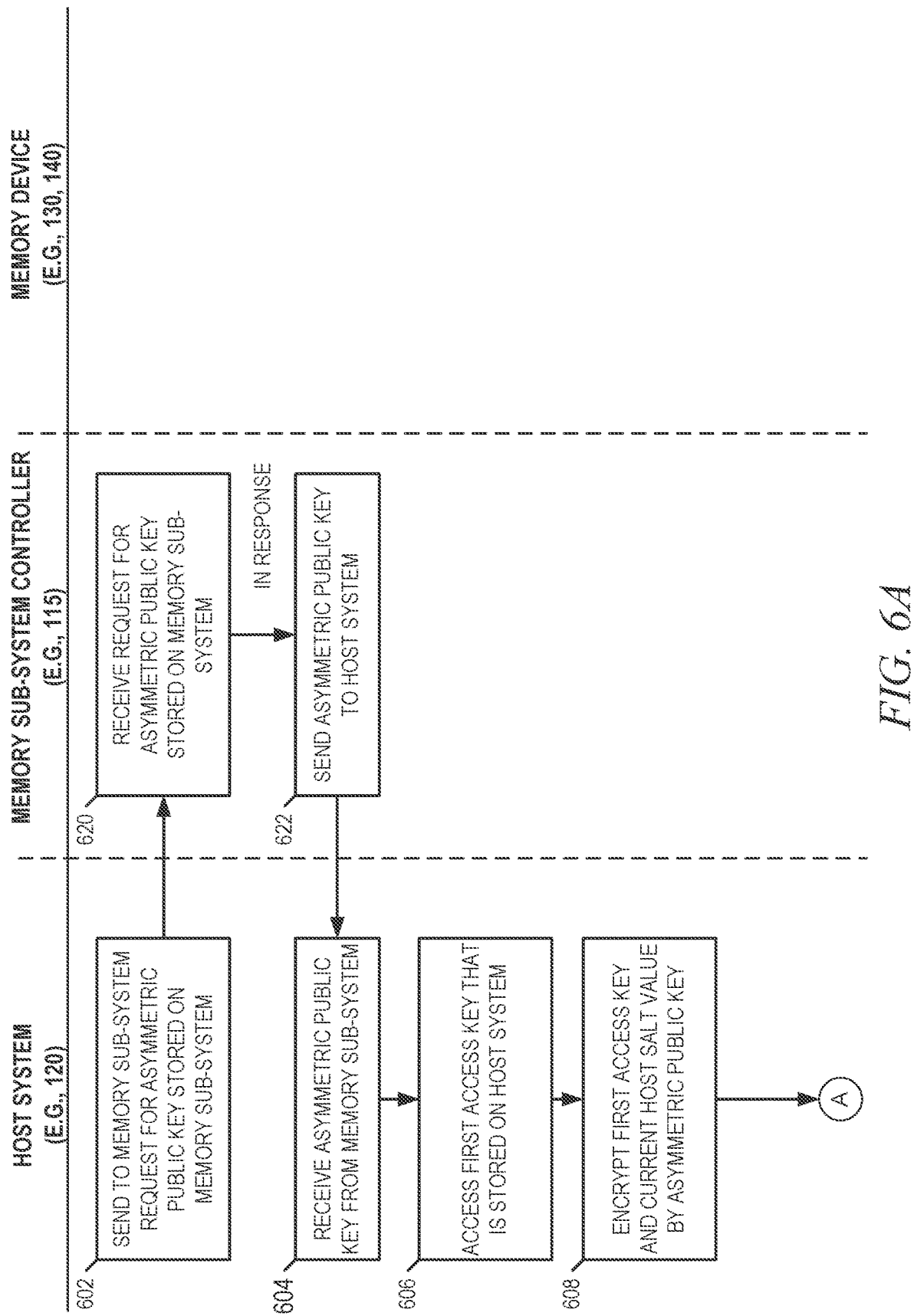
FIGS. 6A through 6D provide an interaction diagram illustrating interactions between components of a computing environment in the context of some embodiments in which a method for secure data communication with a memory sub-system is performed.

As shown in FIG. 6A, at operation 602, the host system 120 sends, from the host system 120 to the memory sub-system 110, a request for an asymmetric public key (e.g., 184) stored on the memory sub-system 110. At operation 620, the memory sub-system controller 115 receives, from the host system 120, the request for the asymmetric public key stored on a memory sub-system 110. At operation 622, the memory sub-system controller 115 sends, to the host system 120, the asymmetric public key in response to the request of operation 620. At operation 604, the host system 120 receives the asymmetric public key from the memory sub-system 110 (in response to the request of operation 602). The host system 120 can store the received asymmetric public key (e.g., as 150) for subsequent usage. At operation 606, the host system 120 accesses a first access key (e.g., 154) currently stored on the host system 120. At operation 608, the host system 120 encrypts the first access key and the current host salt value (e.g., 160) that are stored on the host system 120 by the asymmetric public key (e.g., 150) of the host system 120. In particular, the current host salt value (e.g., 160) can be applied (e.g., concatenated) to the first access key and the resulting data can be encrypted using the asymmetric public key (e.g., 150).

Figure 6B:
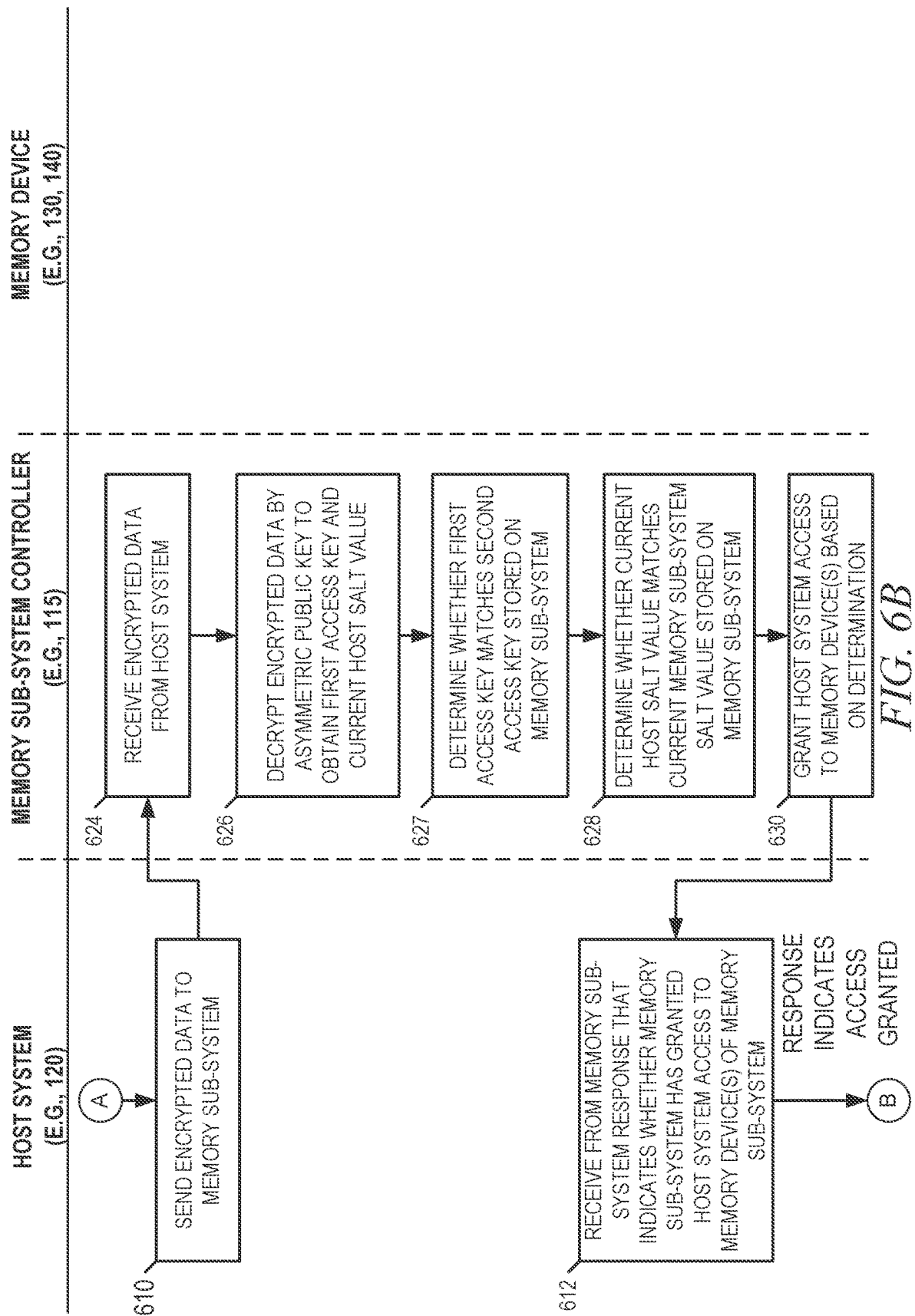

Referring now to FIG. 6B, at operation 610, the host system 120 sends, from the host system 120 to the memory sub-system 110, the encrypted data (obtained at operation 608). At operation 624, the memory sub-system controller 115 receives the encrypted data (comprising the first access key) from the host system 120 and, at operation 626, the memory sub-system 110 decrypts the encrypted data, by an asymmetric private key (e.g., 182), to generate the first access key and the current host salt value from the encrypted data. At operation 627, the memory sub-system controller 115 determines whether the first access key (obtained from decrypting the encrypted data at operation 626) matches a second access key (e.g., 186) stored on the memory sub-system 110. At operation 628, the memory sub-system controller 115 determines whether the current host salt value (obtained from decrypting the encrypted data at operation 626) matches a current memory sub-system salt value (e.g., 192) stored on the memory sub-system 110. At operation 630, the memory sub-system controller 115 grants (e.g., authorizes) the host system 120 access to one or more memory devices (e.g., 130, 140) of the memory sub-system 110 based on the determinations of operation 627 and operation 628. At operation 612, the host system 120 receives a response from the memory sub-system 110 indicating whether the memory sub-system 110 has granted (e.g., authorized) the host system 120 access to one or more memory devices of the memory sub-system 110 (in response to the encrypted data sent at operation 610).

Figure 6C:
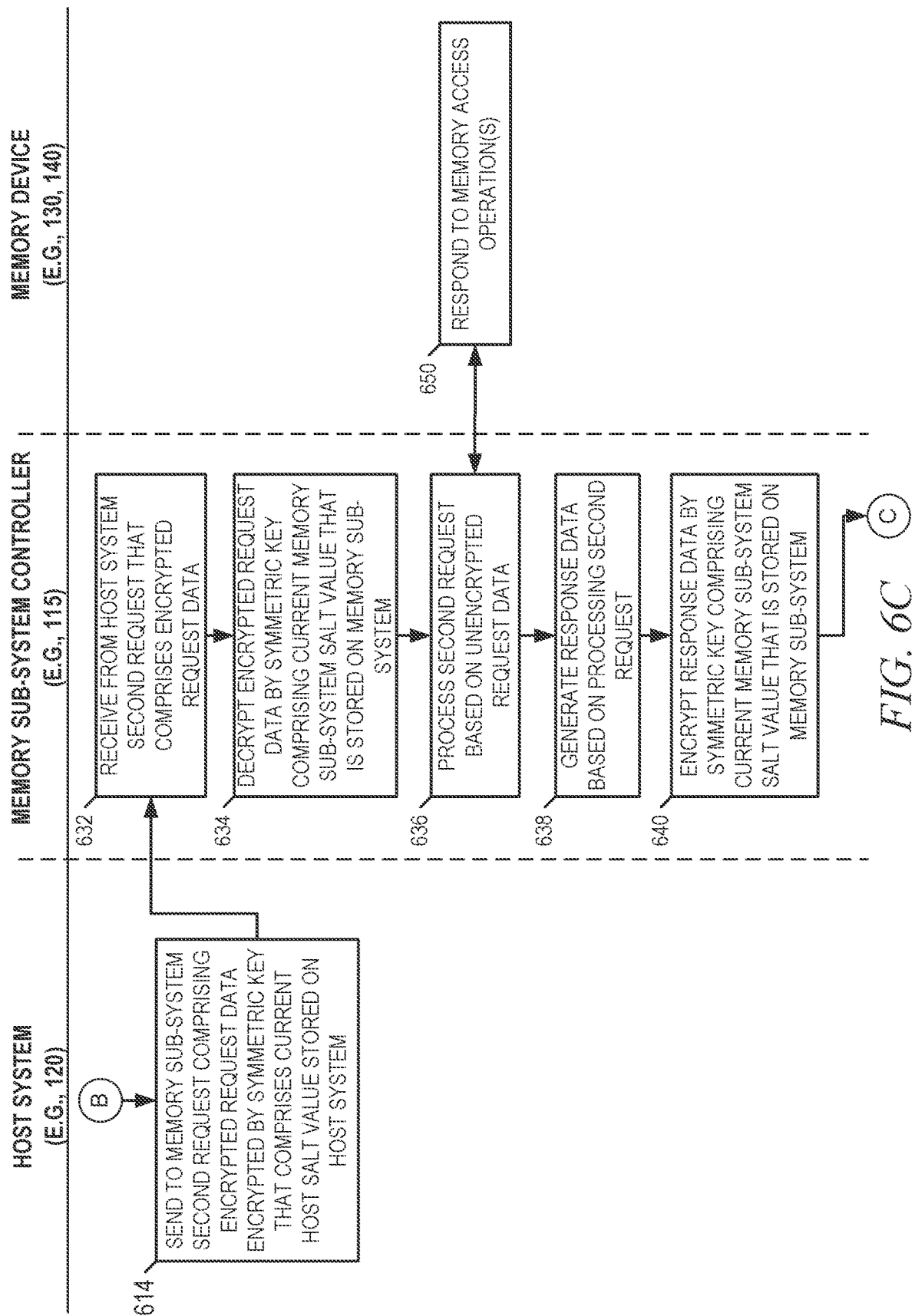

Referring now to FIG. 6C, where the response received at operation 612 indicates that the host system 120 is granted access to the one or more memory devices, at operation 614, the host system 120 sends, from the host system 120 to the memory sub-system 110, a second request comprising encrypted request data. In particular, the sending can comprise the host system 120 encrypting, by the symmetric key (e.g., 16)) stored on the host system 120, at least one of memory command data or memory address data to generate the encrypted requested data. The second request can further comprise a memory command (e.g., NVDIMM-P memory command), which can also be encrypted by the symmetric key. At operation 632, the memory sub-system controller 115 receives, from the host system 120, the second request comprising the encrypted request data. At operation 634, the memory sub-system controller 115 decrypts the encrypted request data, by the symmetric key (e.g., 192) stored on the memory sub-system 110 to obtain unencrypted request data from the encrypted request data. The unencrypted request data can comprise at least one of memory command, command-related data, and a memory address. At operation 636, the memory sub-system controller 115 processes the second request based on the unencrypted request data. At operation 650, the memory device (e.g., 130, 140) of the memory sub-system 110 responds to one or more memory access operations that result from the memory sub-system controller 115 processing the second request at operation 636. At operation 638, the memory sub-system controller 115 generates response data based on the processing of the second request at operation 636. At operation 640, the memory sub-system controller 115 encrypts the response data (generated at operation 638), by the symmetric key (e.g., 192) stored on the memory sub-system 110, to generate encrypted response data.

Figure 6D:
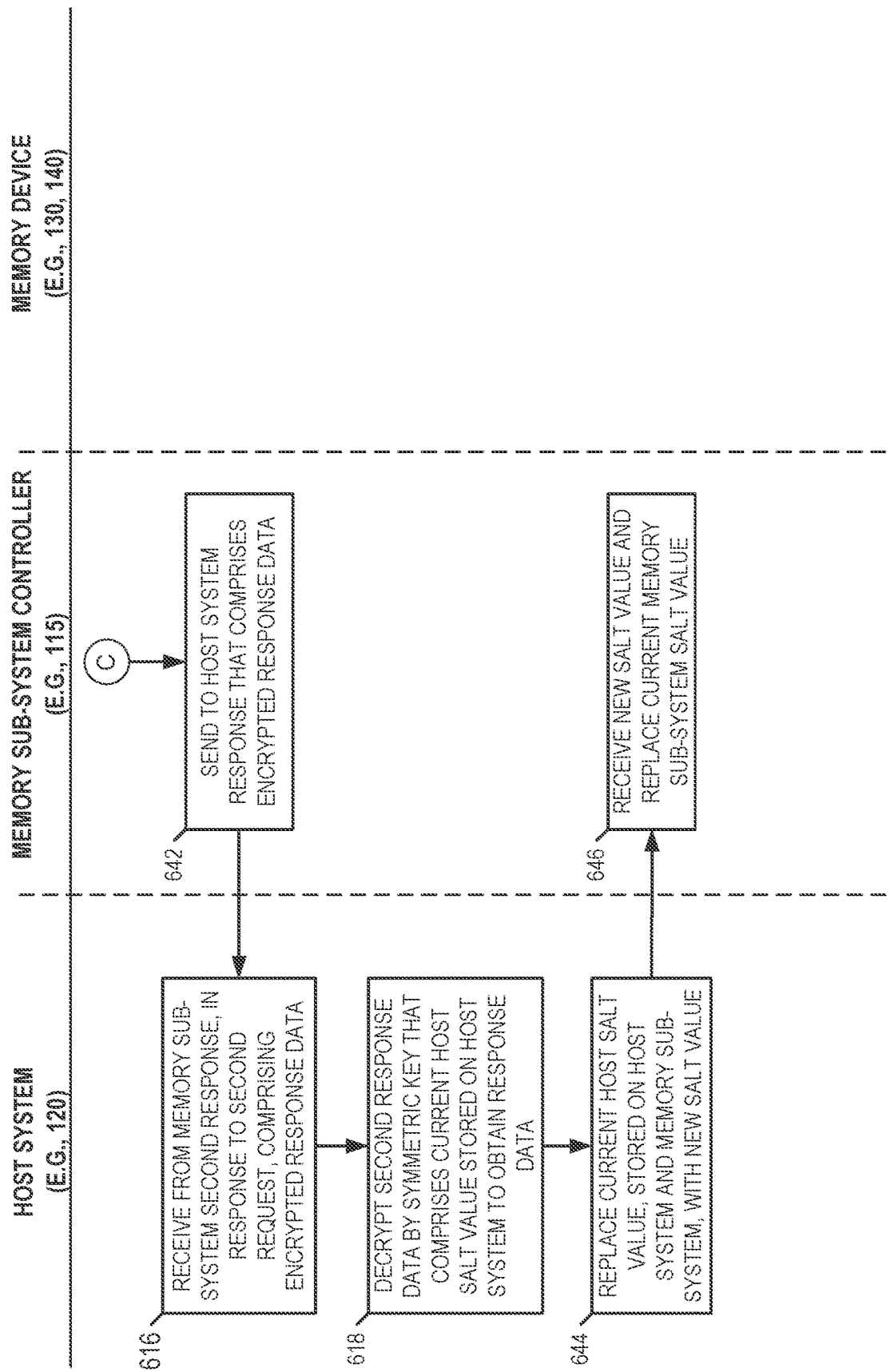

Referring now to FIG. 6D, at operation 642, the memory sub-system controller 115 sends a response comprising the encrypted response data (obtained at operation 640) to the host system 120. In particular, the response can be sent from the memory sub-system 110 to the host system 120 in accordance with a memory protocol, such as a non-deterministic memory protocol (e.g., a NVDIMM-P memory protocol). At operation 616, the host system 120 receives, from the memory sub-system 110, the response comprising encrypted response data. In particular, the response can be received in response to the second request sent from the host system 120 to the memory sub-system 110 at operation 614. At operation 618, the host system 120 decrypts the encrypted response data, by the symmetric key (e.g., 154) stored on the host system 120, to obtain unencrypted response data from the encrypted request data. At operation 644, the host system 120 replaces the current host salt value (e.g., 160) stored on the host system 120 and the current memory sub-system salt value (e.g., 192) stored on the memory sub-system 110 with a new salt value (as described herein). The operation 644 can be performed by the host system 120 at regular or irregular time intervals. As part of the operation 644, at operation 646, the memory sub-system controller 115 receives the new salt value and replaces the current memory sub-system salt value (e.g., 192) stored on the memory sub-system 110 with the received new salt value.

Figure 7:
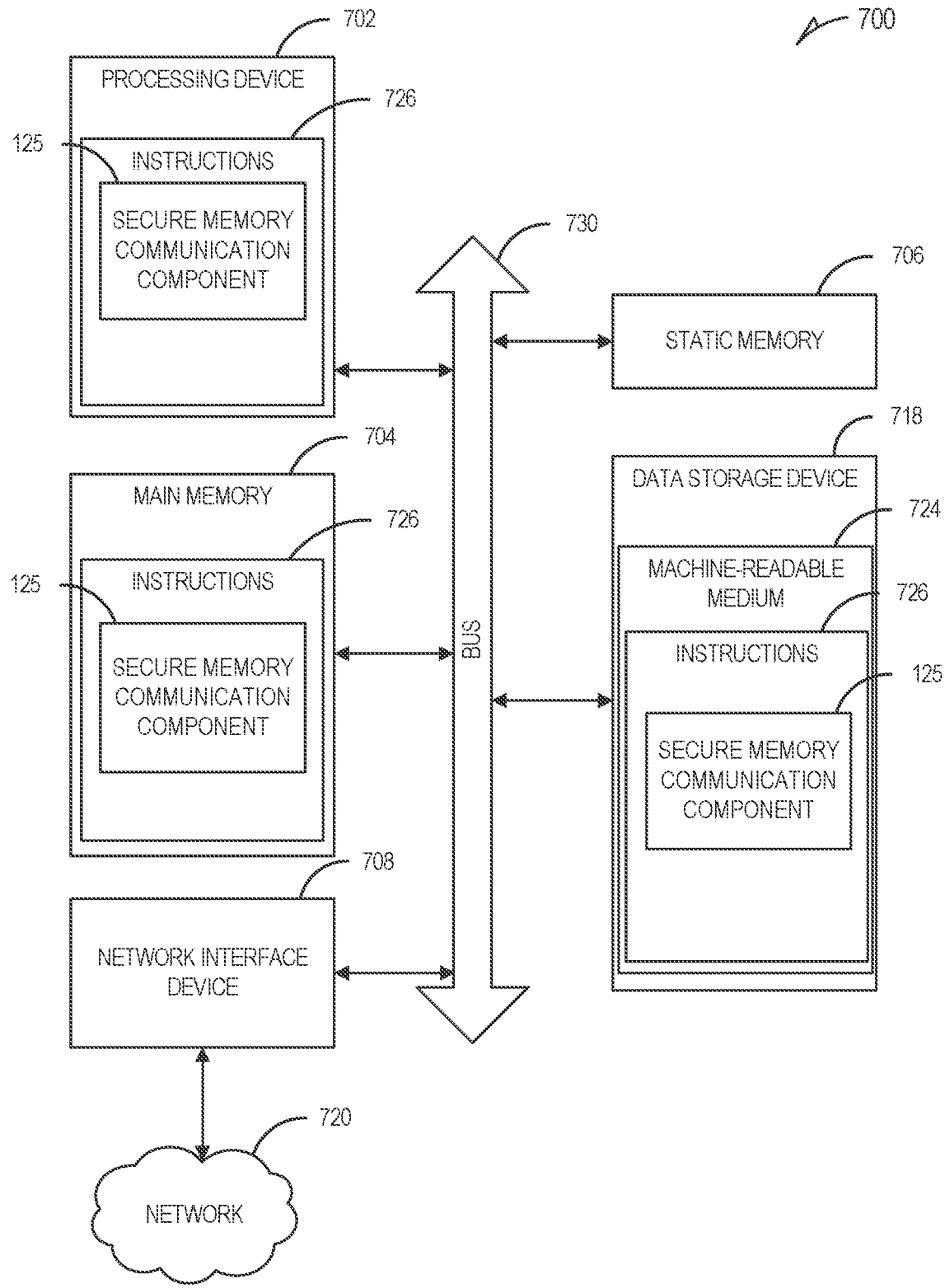
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the secure memory communication component 125 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CIBC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to secure data communication with a memory sub-system as described herein (e.g., the secure memory communication component 125 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM") magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a set of memory devices; and
    a processing device, operatively coupled to the set of memory devices, configured to perform operations comprising:
        receiving, from a host system, a request for an asymmetric public key stored on the memory sub-system;
        sending, to the host system, the asymmetric public key in response to the request;
        receiving, from the host system, encrypted data that comprises a first access key and a current host salt value;
        decrypting, by an asymmetric private key, the encrypted data to obtain the first access key and the current host salt value from the encrypted data, each of the asymmetric private key and the current host salt value used being stored on the memory sub-system;
        determining whether the first access key matches a second access key stored on the memory sub-system;
        determining whether the current host salt value matches a current memory sub-system salt value stored on the memory sub-system;
        in response to determining that the first access key matches the second access key and the current host salt value matches the current memory sub-system salt value, granting the host system access to the set of memory devices; and
        after granting the host system access to the set of memory devices:
            receiving, from the host system, a second request comprising encrypted request data;
            decrypting, by a symmetric key, the encrypted request data to obtain unencrypted request data from the encrypted request data, the symmetric key comprising the current memory sub-system salt value currently stored on the memory sub-system; and
            processing the second request based on the unencrypted request data.

2. The memory sub-system of claim 1, wherein the second request is received from the host system according to a non-deterministic memory protocol.

3. The memory sub-system of claim 2, wherein the non-deterministic memory protocol comprises a Non-Volatile Dual In-Line Memory Module-P (NVDIMM-P) memory protocol.

4. The memory sub-system of claim 1, wherein the operations further comprise:
    after granting the host system access to the set of memory devices:
        generating response data based on the processing of the second request;
        encrypting, by the symmetric key, the response data to generate encrypted response data; and
        sending, to the host system, a response comprising the encrypted response data.

5. The memory sub-system of claim 1, wherein the memory sub-system uses a particular memory address of the memory sub-system to store the current memory sub-system salt value, and wherein the processing of the second request based on the unencrypted request data comprises:
    setting the current memory sub-system salt value to a new salt value by writing the new salt value to the particular memory address, the unencrypted request data specifying the new salt value and the particular memory address.

6. The memory sub-system of claim 5, wherein the particular memory address is associated with a mode register, the mode register being in accordance with a Non-Volatile Dual In-Line Memory Module-P (NVDIMM-P) memory protocol.

7. The memory sub-system of claim 1, wherein the unencrypted request data comprises at least one of memory command data or memory address data.

8. The memory sub-system of claim 1, wherein the request for the asymmetric public key specifies a particular memory address associated with a mode register of the memory sub-system, the mode register being in accordance with a Non-Volatile Dual In-Line Memory Module-P (NVDIMM-P) memory protocol.

9. The memory sub-system of claim 1, wherein the second access key is initially stored on the memory sub-system as part of manufacturing the memory sub-system.

10. The memory sub-system of claim 1, wherein the current memory sub-system salt value is initially stored on the memory sub-system as part of manufacturing the memory sub-system.

11. The memory sub-system of claim 1, wherein each of the asymmetric public key and the asymmetric private key is initially stored on the memory sub-system as part of manufacturing the memory sub-system.

12. A non-transitory computer-readable storage medium comprising instructions that, when executed by a processing device of a memory sub-system, cause the processing device to perform operations comprising:
- receiving, from a host system, a request to read an asymmetric public key from reserved memory space of the memory sub-system;
- sending, to the host system, the asymmetric public key in response to the request;
- receiving, from the host system, encrypted data that comprises a first access key and a current host salt value;
- decrypting, by an asymmetric private key, the encrypted data to obtain the first access key and the current host salt value from the encrypted data, each of the asymmetric private key and the current host salt value used being stored on the memory sub-system;
- determining whether the first access key matches a second access key stored on the memory sub-system;
- determining whether the current host salt value matches a current memory sub-system salt value stored on the memory sub-system;
- in response to determining that the first access key matches the second access key and the current host salt value matches the current memory sub-system salt value, granting the host system access to a set of memory devices of the memory sub-system; and
- after granting the host system access to the set of memory devices:
  - receiving, from the host system, a second request comprising encrypted request data;
  - decrypting, by a symmetric key, the encrypted request data to obtain unencrypted request data from the encrypted request data, the symmetric key comprising the current memory sub-system salt value currently stored on the memory sub-system; and
  - processing the second request based on the unencrypted request data.

13. The non-transitory computer-readable storage medium of claim 12, wherein the second request is received from the host system according to a non-deterministic memory protocol.

14. The non-transitory computer-readable storage medium of claim 13, wherein the non-deterministic memory protocol comprises a Non-Volatile Dual In-Line Memory Module-P (NVDIMM-P) memory protocol.

15. The non-transitory computer-readable storage medium of claim 12, wherein the operations further comprise:
- after granting the host system access to the set of memory devices:
  - generating response data based on the processing of the second request;
  - encrypting, by the symmetric key, the response data to generate encrypted response data; and
  - sending, to the host system, a response comprising the encrypted response data.

16. The non-transitory computer-readable storage medium of claim 12, wherein the memory sub-system uses a particular memory address of the memory sub-system to store the current memory sub-system salt value, and wherein the processing of the second request based on the unencrypted request data comprises:
- setting the current memory sub-system salt value to a new salt value by writing the new salt value to the particular memory address, the unencrypted request data specifying the new salt value and the particular memory address.

17. The non-transitory computer-readable storage medium of claim 16, wherein the particular memory address is associated with a mode register, the mode register being in accordance with a Non-Volatile Dual In-Line Memory Module-P (NVDIMM-P) memory protocol.

18. The non-transitory computer-readable storage medium of claim 12, wherein the request for the asymmetric public key specifies a particular memory address associated with a mode register of the memory sub-system, the mode register being in accordance with a Non-Volatile Dual In-Line Memory Module-P (NVDIMM-P) memory protocol.

19. The non-transitory computer-readable storage medium of claim 12, wherein the second access key is initially stored on the memory sub-system as part of manufacturing the memory sub-system, or wherein the current memory sub-system salt value is initially stored on the memory sub-system as part of manufacturing the memory sub-system.

20. A method comprising:
- receiving, at a memory sub-system, a request from a host system to read an asymmetric public key from reserved memory space of the memory sub-system;
- sending, from the memory sub-system to the host system, the asymmetric public key in response to the request;
- receiving, at the memory sub-system, encrypted data from the host system that comprises a first access key and a current host salt value;
- decrypting, by an asymmetric private key, the encrypted data at the memory sub-system to obtain the first access key and the current host salt value from the encrypted data, each of the asymmetric private key and the current host salt value used being stored on the memory sub-system;
- determining, by the memory sub-system, whether the first access key matches a second access key stored on the memory sub-system;
- determining, by the memory sub-system, whether the current host salt value matches a current memory sub-system salt value stored on the memory sub-system;
- in response to determining that the first access key matches the second access key and the current host salt value matches the current memory sub-system salt value, granting the host system access to a set of memory devices of the memory sub-system; and
- after granting the host system access to the set of memory devices:
  - receiving, at the memory sub-system, a second request from the host system comprising encrypted request data;
  - decrypting, by a symmetric key, the encrypted request data at the memory sub-system to obtain unencrypted request data from the encrypted request data, the symmetric key comprising the current memory sub-system salt value currently stored on the memory sub-system; and
  - processing, by the memory sub-system, the second request based on the unencrypted request data.

\* \* \* \* \*